(12) United States Patent
Park et al.

(10) Patent No.: US 8,164,702 B2
(45) Date of Patent: Apr. 24, 2012

(54) DISPLAY SUBSTRATE, METHOD OF MANUFACTURING THE DISPLAY SUBSTRATE AND DISPLAY DEVICE HAVING THE DISPLAY SUBSTRATE

(75) Inventors: Kee-Bum Park, Cheonan-si (KR); Eun Cho, Cheonan-si (KR); Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 428 days.

(21) Appl. No.: 12/503,259

(22) Filed: Jul. 15, 2009

(65) Prior Publication Data

US 2010/0020259 A1 Jan. 28, 2010

(30) Foreign Application Priority Data

Jul. 23, 2008 (KR) .............................. 2008-0071425

(51) Int. Cl.
  *G02F 1/136* (2006.01)
(52) U.S. Cl. .......................................... 349/48; 349/144
(58) Field of Classification Search .................... 349/48, 349/144
  See application file for complete search history.

(56) References Cited

U.S. PATENT DOCUMENTS

2006/0103800 A1* 5/2006 Li et al. ......................... 349/129

FOREIGN PATENT DOCUMENTS

| JP | 09-269509 A | 10/1997 |
| JP | 11-064884 A | 3/1999 |
| KR | 1020060069766 A | 6/2006 |
| KR | 1020070002933 A | 1/2007 |

* cited by examiner

*Primary Examiner* — Richard Kim
(74) *Attorney, Agent, or Firm* — Cantor Colburn LLP (57) ABSTRACT

A display substrate includes; a dual transistor electrically connected to a first gate line and a data line, which is disposed in a direction substantially perpendicular to the first gate line, the dual transistor including a first drain electrode and a second drain electrode, a pixel electrode having a first pixel part and a second pixel part which are respectively connected to the first drain electrode and the second drain electrode, a connection transistor electrically connected to the second pixel part and a second gate line which is adjacent to the first gate line, the connection transistor comprising a connection drain electrode, a voltage-decreasing electrode extended from a connection drain electrode of the connection transistor a voltage-decreasing line extended in substantially the same direction as the first and second gate lines, and disposed on a data insulation layer overlapping the voltage-decreasing electrode and the data insulation layer.

17 Claims, 4 Drawing Sheets

DISPLAY SUBSTRATE, METHOD OF MANUFACTURING THE DISPLAY SUBSTRATE AND DISPLAY DEVICE HAVING THE DISPLAY SUBSTRATE

This application claims priority to Korean Patent Application No. 2008-71425, filed on Jul. 23, 2008, and all the benefits accruing therefrom under 35 U.S.C. §119, the contents of which in its entirety are herein incorporated by reference.

BACKGROUND OF THE INVENTION

1. Field of the Invention

Exemplary embodiments of the present invention relate to a display substrate, a method of manufacturing the display substrate, and a display device having the display substrate. More particularly, exemplary embodiments of the present invention relate to a display substrate having an enhanced viewing angle and an improved aperture ratio, a method of manufacturing the display substrate, and a display device having the display substrate.

2. Description of the Related Art

Generally, a liquid crystal display ("LCD") device includes a first substrate having a pixel electrode formed in a unit pixel, a second substrate having a common electrode facing the first substrate, and a liquid crystal layer interposed between the first and second substrates. The arrangement of liquid crystal molecules of the liquid crystal layer is varied in response to an electric field generated between the pixel electrode and the common electrode to modify the light transmittance thereof, so that the LCD device may display images.

In some LCD devices, the pixel electrode may include first and second pixel parts which are spaced apart from each other and receive different voltage levels in order to enhance the viewing angle of the LCD device. That is, a first pixel voltage may be applied to the first pixel part, and a second pixel voltage lower than a first pixel voltage may be applied to the second pixel part.

Generally, a drain electrode of a first thin-film transistor ("TFT") overlaps with the first pixel part to be electrically connected to the first pixel part through a first contact hole. A drain electrode of a second TFT overlaps with the second pixel part to be electrically connected to the second pixel part through a second contact hole. A source electrode of a third TFT overlaps with the first pixel part to be electrically connected to the first pixel part through a third contact hole. Additionally, a transparent electrode receiving the second pixel voltage and a gate electrode receiving a storage-down voltage may define a capacitor. Therefore, the second pixel voltage may be decreased to be less than the first pixel voltage. Here, the third TFT is electrically connected to the transparent electrode through a fourth contact hole, and the gate electrode is connected to a gate line made of a gate metal pattern.

However, an aperture ratio may be reduced by the fourth contact hole and the gate line. As a result, image display quality may be decreased.

BRIEF SUMMARY OF THE INVENTION

Exemplary embodiments of the present invention provide a display substrate having an enhanced viewing angle and an improved aperture ratio.

Exemplary embodiments of the present invention provide a method of manufacturing the above-mentioned display substrate.

Exemplary embodiments of the present invention provide a display device including the above-mentioned display substrate.

According to one exemplary embodiment of the present invention, a display substrate includes; a dual transistor electrically connected to a first gate line and a data line, which is disposed in a direction substantially perpendicular to the first gate line, the dual transistor comprising a first drain electrode and a second drain electrode, a pixel electrode having a first pixel part and a second pixel part which are respectively connected to the first drain electrode and the second drain electrode, a connection transistor electrically connected to the second pixel part and a second gate line which is adjacent to the first gate line, the connection transistor including a connection drain electrode, a voltage-decreasing electrode extended from the connection drain electrode of the connection transistor, a data insulation layer disposed on the voltage-decreasing electrode, and a voltage-decreasing line extended in substantially the same direction as the first gate line and the second gate line, the voltage decreasing line overlapping the voltage-decreasing electrode and the data insulation layer.

In an exemplary embodiment of the present invention, the pixel electrode and the voltage-decreasing line may be disposed on a same layer of the display substrate and are formed from a substantially similar transparent metal material. In one exemplary embodiment, the first and second gate lines, a gate electrode of the dual transistor and a connection gate electrode of the connection transistor may be disposed on a same layer of the display substrate and are formed from a substantially similar gate metal material. In one exemplary embodiment, the data line, a source electrode of the dual transistor, the first drain electrode of the dual transistor and the second drain electrode of the dual transistor, a first contact electrode extended from the first drain electrode, a second contact electrode extended from the second drain electrode, a connection source electrode of the connection transistor, a third contact electrode extended from the connection source electrode, and the voltage-decreasing electrode may be disposed on a same layer of the display substrate and are formed from a substantially similar data metal material. The display substrate may further include active patterns disposed on the source electrode of the dual transistor, the first drain electrode of the dual transistor, the second drain electrode of the dual transistor, the connection source electrode of the connection transistor and the connection drain electrode.

In an exemplary embodiment of the present invention, the display substrate may further include a gate insulation layer disposed between the gate metal material and the data metal material, wherein the data insulation layer may be disposed between the data metal material and the transparent metal material. The display substrate may further include a voltage-decreasing groove disposed in the data insulation layer and aligned with the voltage-decreasing electrode so as to reduce a distance interval between the voltage-decreasing electrode and the voltage-decreasing line.

In an exemplary embodiment of the present invention, the data insulation layer may include an organic insulation layer having a voltage-decreasing hole disposed therein aligned with the voltage-decreasing groove, and an inorganic insulation layer disposed on the organic insulation layer.

In an exemplary embodiment of the present invention, a length of the voltage-decreasing electrode in a direction substantially parallel to the first gate line may be substantially larger than a length of the voltage decreasing electrode in a direction substantially parallel to the data line.

In an exemplary embodiment of the present invention, a length of the voltage-decreasing groove in the direction substantially parallel to the first gate lines may be substantially larger than a length of the voltage-decreasing groove in the direction is substantially parallel to the data line.

In an exemplary embodiment of the present invention, the data insulation layer may include a first contact hole electrically connecting the first pixel part to the first contact electrode, a second contact hole electrically connecting the second pixel part to the second contact electrode, and a third contact hole electrically connecting the second pixel part to the third contact electrode.

In an exemplary embodiment of the present invention, the display device may further include a storage line underlying the first pixel part and the second pixel part. In one exemplary embodiment, a voltage-decreasing line and the storage line receive a common voltage.

In an exemplary embodiment of the present invention, a portion of the voltage-decreasing line corresponding to the data line may be removed to reduce an overlapping area between the voltage-decreasing line and the data line.

According to another exemplary embodiment of the present invention, a method of manufacturing a display substrate includes; disposing a gate line having a first gate line and a second gate line which are adjacent to each other on an insulating substrate, connecting a gate electrode of a dual transistor to the first gate line, and connecting a connection gate electrode of a connection transistor to the second gate line, disposing a data line substantially perpendicular to the gate line, connecting a source electrode of the dual transistor to the data line, disposing a first drain electrode of the dual transistor substantially opposite to the source electrode of the dual transistor, disposing a second drain electrode of the dual transistor substantially opposite to the source electrode of the dual transistor, extending a first contact electrode from the first drain electrode of the dual transistor, extending a second contact electrode from the second drain electrode, disposing a connection source electrode of the connection transistor on substantially a same layer as the first contact electrode, extending a third contact electrode from the connection source electrode of the connection transistor, disposing a connection drain electrode of the connection transistor substantially opposite to the connection source electrode, extending a voltage-decreasing electrode from the connection drain electrode of the connection transistor, disposing a data insulation layer overlapping the source electrode of the dual transistor, the first drain electrode of the dual transistor and the second drain electrode of the dual transistor, the connection source electrode of the connection transistor, the connection drain electrode of the connection transistor, the first contact electrode and the third contact electrode and the voltage-decreasing electrode, forming a pixel electrode including a first pixel electrode electrically connected to the first contact electrode and a second electrode electrically connected to the second contact electrode, and disposing a voltage-decreasing line aligned with the voltage-decreasing electrode.

In an exemplary embodiment of the present invention the method further includes; disposing a gate insulation layer covering the gate line, the gate electrode of the dual transistor and the connection gate electrode of the connection transistor.

In an exemplary embodiment of the present invention, the disposing of the data insulation layer includes removing a portion of the data insulation layer to form a voltage-decreasing groove According to still another exemplary embodiment of the present invention, a display device includes; a first substrate including; a dual transistor electrically connected to a first gate line and a data line which is formed in a direction substantially perpendicular to the first gate line, and a first drain electrode and a second drain electrode, a pixel electrode has a first pixel part and a second pixel part which are respectively connected to the first drain electrode and the second drain electrode, the connection transistor is electrically connected to the second pixel part and a second gate line which is disposed adjacent to the first gate line, the connection transistor comprising a connection drain electrode, a voltage-decreasing electrode extended from the connection drain electrode of the connection transistor, a data insulation layer disposed on the voltage-decreasing electrode, and a voltage-decreasing line is extended in the same direction as the first and second gate lines, and disposed on the data insulation layer to overlap with the voltage-decreasing electrode and the data insulation layer which are below the voltage-decreasing line, a second substrate facing the first substrate, and a liquid crystal layer interposed between the first substrate and the second substrate.

In an exemplary embodiment of the present invention, the pixel electrode and the voltage-decreasing line may be disposed on a same layer of the display substrate and are formed from a substantially similar transparent metal material.

In an exemplary embodiment of the present invention, the display device may further include a voltage-decreasing groove aligned with the voltage-decreasing electrode so as to reduce a distance interval between the voltage-decreasing electrode and the voltage-decreasing line.

According to the present invention, a storage-down voltage is directly applied to a voltage-decreasing line which is a transparent metal pattern. Thus, the area of gate metal patterns may be reduced, and the area of contact holes may be reduced; thus, the aperture ratio may be improved.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the example embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements or layers present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, integers, steps, operations, elements, and/or components, but do not preclude the presence or addition of one or more other features, regions, integers, steps, operations, elements, components, and/or groups thereof.

Exemplary embodiments of the invention are described herein with reference to cross-sectional illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Exemplary Embodiment 1

Figure 1:
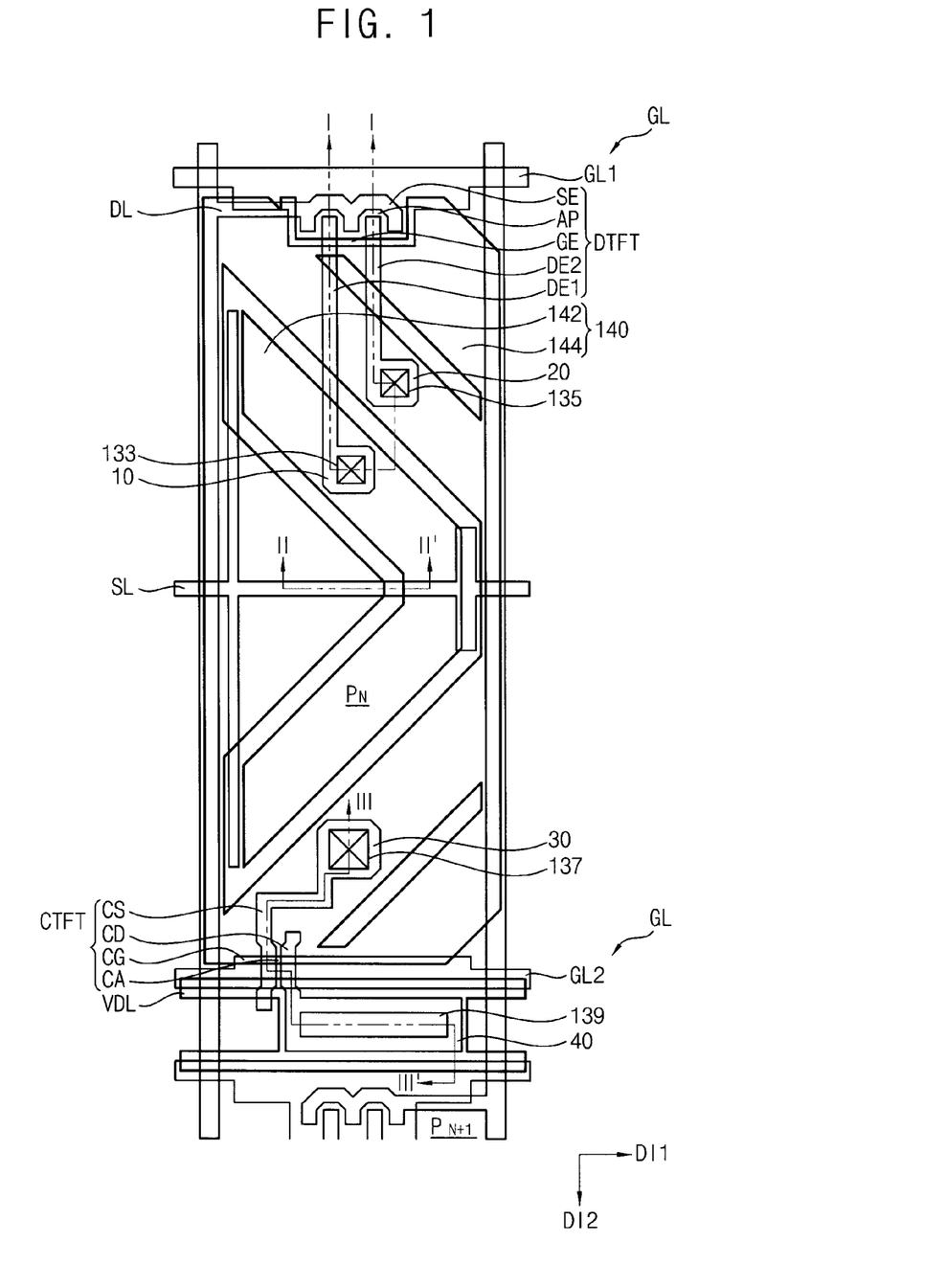
FIG. 1 is a top plan layout view illustrating an exemplary embodiment of a unit pixel of a first exemplary embodiment of a display device according to the present invention.
Figure 2:
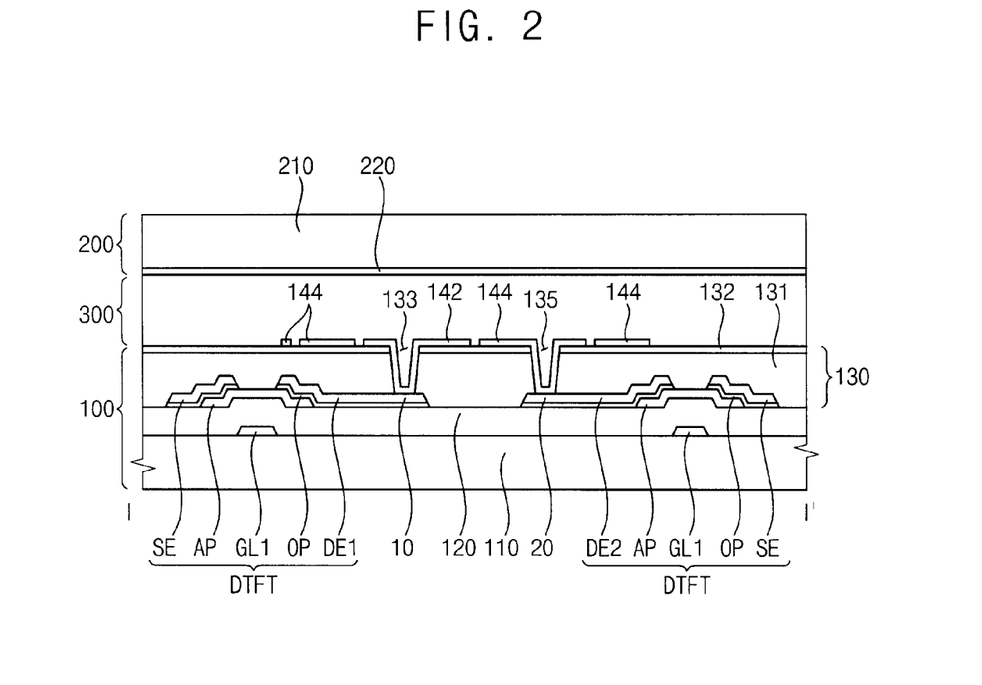
FIG. 2 is a cross-sectional view taken along line I-I' in FIG. 1.
Figure 3:
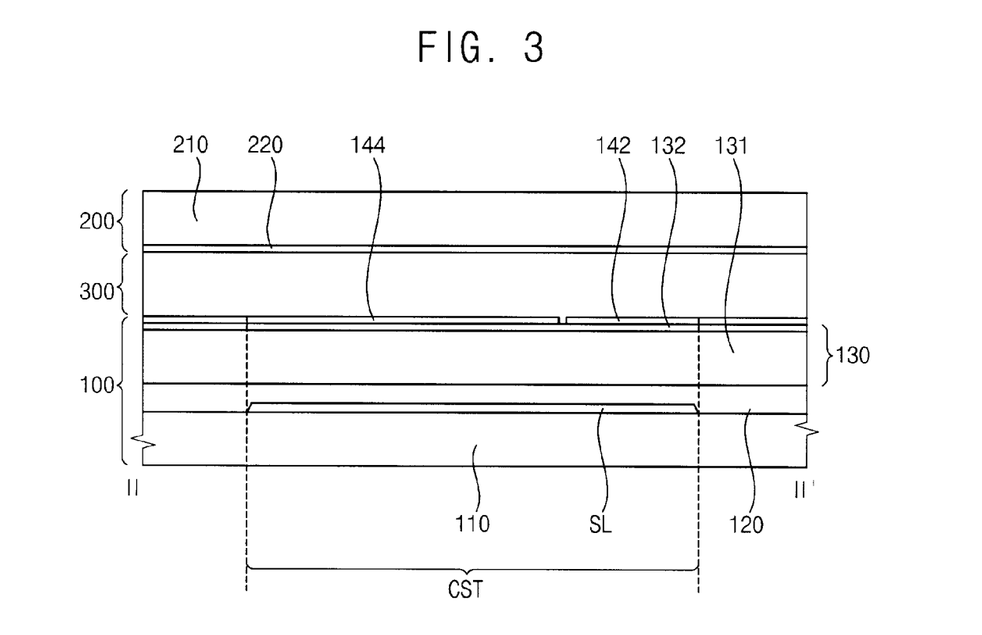
FIG. 3 is a cross-sectional view taken along line II-II' in FIG. 1.
Figure 4:
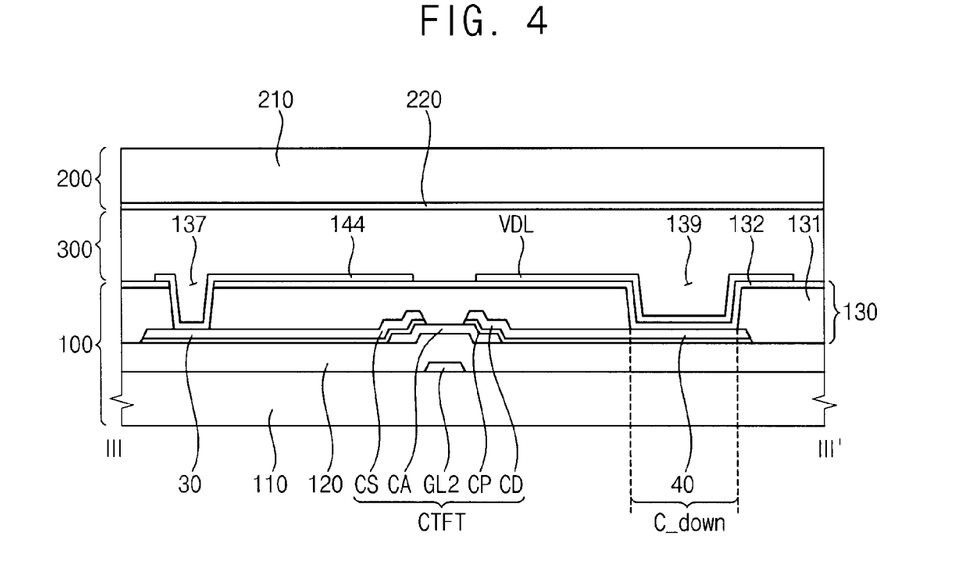
FIG. 4 is a cross-sectional view taken along line III-III' in FIG. 1.

FIG. 1 is a top plan view illustrating an exemplary embodiment of a unit pixel of a first exemplary embodiment of a display device according to the present invention. FIG. 2 is a cross-sectional view taken along line I-I' in FIG. 1. FIG. 3 is a cross-sectional view taken along line II-II' in FIG. 1. FIG. 4 is a cross-sectional view taken along line III-III' in FIG. 1.

Referring to FIGS. 1 to 4, the first exemplary embodiment of a display device according to the present invention includes a first substrate 100, a second substrate 200 facing the first substrate 100, and a liquid crystal layer 300 interposed between the first and second substrates 100 and 200.

In the present exemplary embodiment, the first substrate 100 may include a first transparent substrate 110, a plurality of gate lines GL, a plurality of storage lines SL, a gate insulation layer 120, a plurality of voltage-decreasing lines VDL, a plurality of data lines DL, a data insulation layer 130, a plurality of pixel electrodes 140, each of which includes first and second pixel parts 142 and 144, respectively, a plurality of dual transistors DTFT, a plurality of connection transistors CTFT, a plurality of first contact electrodes 10, a plurality of second contact electrodes 20, a plurality of third contact electrodes 30 and a plurality of voltage-decreasing electrodes 40.

In one exemplary embodiment, the first transparent substrate 110 may have a plate shape. The first transparent substrate 110 may include a transparent material, exemplary embodiments of which include glass, quartz, synthetic resins and other materials with similar characteristics.

The gate lines GL are formed on the first transparent substrate 110, and extend in a first direction DI1. Here, the gate lines GL include a first gate line GL1 and a second gate line GL2 that are adjacent to each other. In one exemplary embodiment, the first gate line GL1 and the second gate line GL2 are substantially parallel with each other.

The storage lines SL are formed on the first substrate 110, and in one exemplary embodiment are formed at substantially the same layer as the gate lines GL. Each of the storage lines SL is formed between the first gate line GL1 and the second gate line GL2. Alternative exemplary embodiments include configurations wherein the storage lines SL may be omitted.

The gate insulation layer 120 is formed on the first transparent substrate 110 to cover the gate line GL and the storage line SL. Exemplary embodiments of the gate insulation layer 120 may include silicon oxide ("SiOx"), silicon nitride ("SiNx"), and other materials with similar characteristics.

The data lines DL are formed on the gate insulation layer 120, and extend in a second direction DI2 which is different from the first direction DI1. In one exemplary embodiment, the first direction DI1 may be substantially perpendicular to the second direction DI2.

The first, second and third contact electrodes 10, 20 and 30 and the voltage-decreasing electrodes 40 are formed on the gate insulation layer 120, and are each formed within in a unit pixel, respectively. In one exemplary embodiment, the first, second and third contact electrodes 10, 20 and 30 may have square shapes when viewed from a top plan view.

Each of the dual transistors DTFT includes a gate electrode GE, an active pattern AP, an ohmic contact pattern OP, a source electrode SE, a first drain electrode DE1 and a second drain electrode DE2.

In one exemplary embodiment, the gate electrode GE may extend from a portion of the first gate line GL1. The active pattern AP is formed on the gate insulation layer 120 to overlap with the gate electrode GE. The ohmic contact pattern OP is formed on the active pattern AP, and separated into two portions.

The source electrode SE is extended from the data line DL to be formed on a portion of the ohmic contact pattern OP. In the present exemplary embodiment, the source electrode SE may have a shape in which two U-shapes are connected to each other, e.g., the source electrode SE may include two adjacent structures, each of which is adjacent to three sides of one of the drain electrodes DE1 and DE2, respectively.

The first drain electrode DE1 and the second drain electrode DE2 are formed on the ohmic contact pattern OP to be spaced apart from each other. The first and second drain electrodes DE1 and DE2 are spaced apart from the source electrode SE.

The first drain electrode DE1 is formed between one of two U-shapes of the source electrode SE, and is electrically connected to the first contact electrode 10. Thus, the first drain electrode DE1 is electrically connected to the first pixel part 142.

The second drain electrode DE2 is formed between one of two U-shapes of the source electrode SE, and is electrically connected to the second contact electrode 20. Thus, the second drain electrode DE2 is electrically connected to the second pixel part 144.

Each of the connection transistors CTFT includes a connection gate electrode CG, a connection active pattern CA, a connection ohmic contact pattern CP, a connection source electrode CS and a connection drain electrode CD.

In the present exemplary embodiment, the connection gate electrode CG may be a portion of the second gate line GL2. The connection active pattern CA is formed on the gate insulation layer 120 to overlap the connection gate electrode CG. The connection ohmic contact pattern CP is disposed on the connection active pattern CA, and is separated into two portions.

The connection source electrode CS is formed on a portion of the connection ohmic contact pattern CP to overlap with a portion of the connection active pattern CA. The connection source electrode CS extends toward the second pixel part 144 to be electrically connected to the third contact electrode 30. The connection source electrode CS is electrically connected to the second pixel part 144 through a third contact hole 137.

The connection drain electrode CD is formed on a portion of the connection ohmic contact pattern CP to overlap with a portion of the connection active pattern CA. The connection drain electrode CD is spaced apart from the connection source electrode CS. The connection drain electrode CD extends toward the voltage-decreasing lines VDL to be electrically connected to the voltage-decreasing electrodes 40. The connection drain electrode CD and the voltage-decreasing lines VDL may define a down-voltage capacitor C_down.

The data insulation layer 130 is formed over the gate insulation layer 120 to cover the data lines DL, the source electrodes SE, the first and second drain electrodes DE1 and DE2, the first contact electrodes 10, the second contact electrodes 20, the connection source electrodes CS, the third contact electrodes 30, the connection drain electrodes CD and the voltage-decreasing electrodes 40. Exemplary embodiments of the data insulation layer 130 may include an organic insulation layer 131 and an inorganic insulation layer 132. In such an exemplary embodiment, the inorganic insulation layer 132 may be formed on the organic insulation layer 131, and the voltage-decreasing lines VDL may be formed on the inorganic insulation layer 132.

A first contact hole 133 is formed through the data insulation layer 130 corresponding to the first contact electrode 10, and a second contact hole 135 is formed through the data insulation layer 130 corresponding to the second contact electrode 20. The third contact hole 137 is formed through the data insulation layer 130 corresponding to the third contact electrode 30, and a voltage-decreasing groove 139 is formed over and aligned with an upper portion of each of the voltage-decreasing electrodes 40. For example, each of the first to third contact holes 133, 135 and 137 may have a square shape when viewed from a top plan view. In one exemplary embodiment, each area of the first contact hole 133, the second contact hole 135, and the third contact hole 137 may be smaller than that of the first contact electrode 10, the second contact electrode 20, and the third contact electrode 30, respectively.

The pixel electrodes 140 are formed on the data insulation layer 130, respectively, within the unit pixels. The pixel electrodes 140 may include a transparent metal pattern, which in one exemplary embodiment may be patterned from a conductive material. Each of the pixel electrodes 140 includes the first pixel part 142 and the second pixel part 144 that are spaced apart from each other. In one exemplary embodiment, the first pixel part 142 may be formed in a center area of the unit pixel. In such an exemplary embodiment, the first pixel part 142 may have a substantially symmetrical shape with respect to a center imaginary line which crosses a center portion of the unit pixel along the first direction DI1. The second pixel part 144 may be formed in a peripheral area of the first pixel part 142 and substantially surround the first pixel part 142. In one exemplary embodiment, the second pixel part 144 may have a substantially symmetrical shape with respect to the center imaginary line.

The first pixel part 142 makes electrical contact with the first contact electrode 10 through the first contact hole 133. The second pixel part 144 makes electrical contact with the second contact electrode 20 through the second contact hole 135. In one exemplary embodiment, the first and second contact electrodes 10 and 20 may be formed over the center imaginary line when viewed from a top plan view. Alternative exemplary embodiments include configurations wherein the first contact electrode 10 may be formed under the center imaginary line when viewed from a top plan view. In the exemplary embodiment where the storage line SL is present, each of the first and second pixel parts 142 and 144 is formed on the data insulation layer 130 to overlap the storage line SL.

A storage capacitor CST is formed between the first and second pixel parts 142 and 144 and the storage line SL. Here, the gate insulation layer 120 and the data insulation layer 130 are thickly formed between the first and second pixel parts 142 and 144 and the storage line SL, so that the capacitance of the storage capacitor CST may be small.

Then, the second substrate 200 is disposed to face the first substrate 100. In one exemplary embodiment, the second substrate 200 may include a second transparent substrate 210 facing the first substrate 100 and a common electrode 220 formed on a portion of the second transparent substrate 210. In one exemplary embodiment, the common electrode 220 may include an optically transparent and electrically conductive material. Moreover, in one exemplary embodiment the second transparent substrate 210 may have a plate shape, and may include glass, quartz, synthetic resins, or other similar materials.

The liquid crystal layer 300 is interposed between the first and second substrates 100 and 200. The arrangement of liquid crystal molecules in the liquid crystal layer 300 is rearranged due to an electric field formed between the pixel electrodes 140 and the common electrode 220, so that light transmittance may be altered by the magnitude of the applied electric field.

Hereinafter, the voltage-decreasing grooves 139 and the voltage-decreasing line VDL will be described in more detail.

Figure 5:
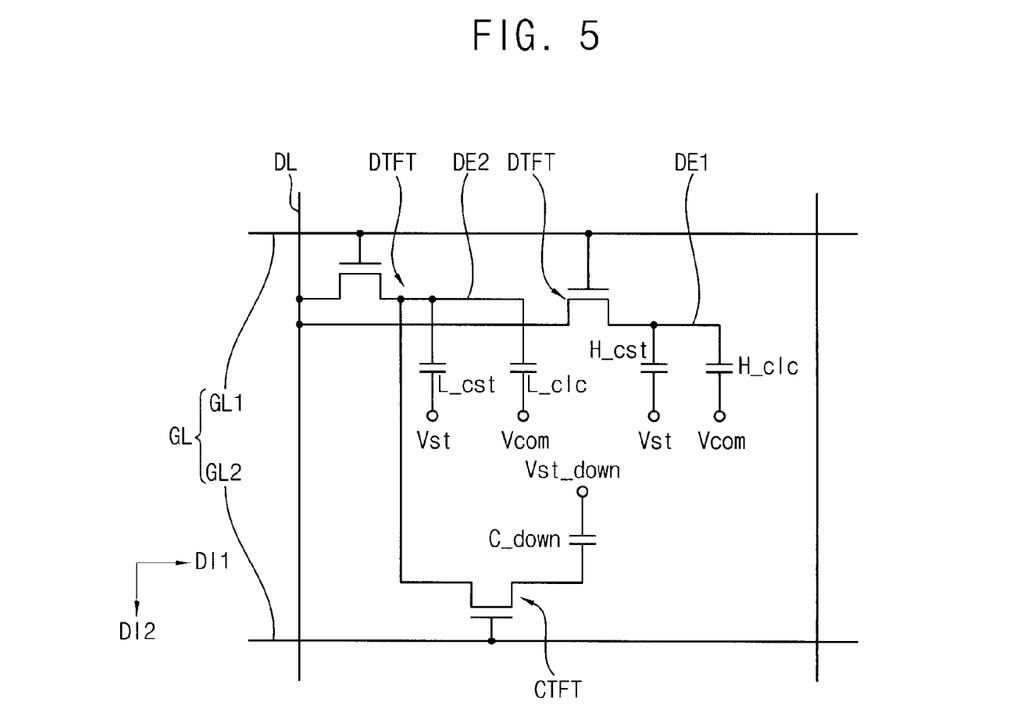
FIG. 5 is a schematic circuit diagram illustrating an exemplary embodiment of the electrical connection in FIG. 1.

Referring to FIGS. 1, 4 and 5, the voltage-decreasing grooves 139 are formed in an area corresponding to the voltage-decreasing electrode 40 so as to reduce a distance interval between the voltage-decreasing electrode 40 and the voltage-decreasing line VDL. Exemplary embodiments include configurations wherein the voltage-decreasing grooves 139 may have square shapes when viewed from a top plan view and alternative exemplary embodiments include configurations wherein the voltage-decreasing grooves 139 may have rectangular shapes when viewed from a top plan view. Each area of the voltage-decreasing grooves 139 is smaller than each area of the voltage-decreasing electrodes 40. In one exemplary embodiment, a distance interval in the first direction DI1 of the voltage-decreasing groove 139 is longer than a distance interval in the second direction DI2 of the voltage-decreasing groove 139. In one exemplary embodiment, a plurality of voltage-decreasing holes (not shown) is formed through the organic insulation layer 131 by removing portions of the organic insulation layer 131 in order to form the voltage-decreasing grooves 139.

In the present exemplary embodiment, the inorganic insulation layer 132 is formed on the organic insulation layer 131, and the voltage-decreasing line VDL is formed on the inorganic insulation layer 132. The inorganic insulation layer 132 is directly formed on the voltage-decreasing electrodes 40 in an area corresponding with the voltage-decreasing grooves 139 due to the voltage-decreasing holes (not shown). Therefore, the distance interval between the voltage-decreasing electrodes 40 and the voltage-decreasing line VDL may be reduced to a distance substantially equal to the thickness of the organic insulating layer 132, so that the capacitance of the down-voltage capacitor C_down may be increased. Exemplary embodiments of the inorganic insulation layer 132 may include silicon oxide ("SiOx"), silicon nitride ("SiNx"), and other materials with similar characteristics.

In one exemplary embodiment, the voltage-decreasing line VDL may include a transparent metal pattern patterned from substantially the same conductive material as the pixel electrodes 140. In one exemplary embodiment, the voltage-decreasing line VDL and the pixel electrodes 140 may include indium tin oxide ("ITO"), indium zinc oxide ("IZO"), amorphous indium tin oxide ("a-ITO"), and other materials having similar characteristics.

Here, the voltage-decreasing grooves 139 are formed through the data insulation layer 130. Therefore, the distance interval between the voltage-decreasing electrode 40 and the voltage-decreasing line VDL may be reduced, so that the capacitance of the down-voltage capacitor C_down may be increased.

Therefore, a storage-down voltage Vst_down for the down-voltage capacitor C_down formed by the voltage-decreasing grooves 139 is directly applied to the voltage-decreasing line VDL that is a transparent metal pattern. Thus, separate contact holes for providing voltages of the first and second pixel electrodes 142 and 144 to the voltage-decreasing line VDL may not be needed, so that an aperture ratio may be increased. In one exemplary embodiment, the storage-down voltage Vst_down may be a common voltage.

In one exemplary embodiment, the storage-down voltage Vst_down is directly applied to the voltage-decreasing line VDL and another signal line on the same layer as the gate line is not formed on the first transparent substrate 110, so that a space between another gate line and the gate line GL may be decreased. The storage-down voltage Vst_down is directly applied to the voltage-decreasing line VDL, therefore contact holes through the data insulation layer 130 are not needed for the storage-down voltage Vst_down.

A voltage of the second pixel electrode 144 is provided to the voltage-decreasing electrodes 40 when the connection transistor CTFT is turned on. In one exemplary embodiment, the voltage-decreasing electrodes 40 may be formed from substantially the same data metal patterns as the data line DL. The storage-down voltage Vst_down is applied to the voltage-decreasing line VDL. The voltage-decreasing line VDL includes the transparent metal patterns, which may be formed from substantially the same metal layer as the pixel electrodes 140. Therefore, the data metal patterns and the transparent metal patterns may define the down-voltage capacitor C_down. Thus, a distance interval in the second direction DI2 between the second gate line GL2 of a (n)-th unit pixel PN and the first gate line GL1 of a (n+1)-th unit pixel PN+1 of the present exemplary embodiment may be shorter than the same distance in the second direction DI2 when the storage-down voltage Vst_down is applied to gate metal patterns formed below the data metal patterns. Here, n is a natural number.

For example, a total distance interval in the second direction DI2 of the second gate line GL2 of the (n)-th unit pixel PN, the down-voltage storage line (not shown) and the first gate line GL1 of the (n+1)-th unit pixel PN+1 may be at least about 88 μm when the down-voltage storage line is formed from a gate metal patterns.

However, a total distance interval in the second direction DI2 of the second gate line GL2 of the (n)-th unit pixel PN and the first gate line GL1 of the (n+1)-th unit pixel PN+1 when the voltage-decreasing line VDL includes the transparent metal pattern patterned from the conductive material substantially the same as the pixel electrodes 140 may be reduced due to the absence of a down-voltage storage line formed in the gate metal layer. For example, a total distance interval in the second direction DI2 of the second gate line GL2 of the (n)-th unit pixel PN, the first gate line GL1 of the (n+1)-th unit pixel PN+1, and the voltage-decreasing electrode 40 is at least about 58 μm. Additionally, a distance interval in the first direction of the voltage-decreasing electrode is larger than a distance interval in the second direction of the voltage-decreasing electrode, and a distance interval in the first direction of the voltage-decreasing groove is larger than a distance interval in the second direction of the voltage-decreasing groove.

Here, the distance interval in the second direction of the voltage-decreasing electrode 40 may be sufficient to form the voltage-decreasing groove 139. Thus, the distance interval in the second direction of the voltage-decreasing electrode 40 may be smaller than that of the extra contact holes (not shown). Therefore, the area capable of transmitting light may be increased and an aperture ratio may be improved.

According to the first exemplary embodiment of the present invention, the area of gate metal patterns may be reduced, and the area of contact holes may be reduced; thus, the aperture ratio may be improved.

Although not shown in FIG. 1, exemplary embodiments of the present invention include configurations wherein a portion of the voltage-decreasing line VDL corresponding to the data lines DL may be removed so as to reduce an overlapping area between the voltage-decreasing line VDL and the data lines DL. A capacitor having a small capacitance may be formed by the voltage-decreasing line VDL and the data lines DL excluding the down-voltage capacitor C_down defined by the voltage-decreasing grooves 139. Additionally, other capacitors having small capacitances may be defined between the voltage-decreasing line VDL and the connection source electrode CS, and between the voltage-decreasing line VDL and the connection drain electrode CD. Thus, holes having square shapes may be formed in the voltage decreasing lines VDL.

FIG. 5 is a schematic circuit diagram illustrating the electrical connection in FIG. 1. Hereinafter, an electrical connection relationship of the unit pixel as shown in FIG. 1 will be described with reference to the accompanying FIG. 5.

The down-voltage capacitor C_down includes the voltage-decreasing line VDL, the data insulation layer 130 and the voltage-decreasing electrodes 40.

The gate line GL is formed in the first direction DI1. The gate line GL may include the first gate lines GL1 and the second gate lines GL2 that are adjacent to each other. The data line DL is formed along the second direction DI2.

A gate electrode of the dual transistor DTFT is electrically connected to the first gate line GL1. A source electrode of the dual transistor DTFT is electrically connected to the data line DL.

A first drain electrode DE1 of the dual transistor DTFT is electrically connected to a first electrode of a high liquid crystal capacitor H_clc, and a first electrode of a high storage capacitor H_cst.

A second drain electrode DE2 of the dual transistor DTFT is electrically connected to a first electrode of a low liquid crystal capacitor L_clc, a first electrode of a low storage capacitor L_cst, and a connection source electrode of the connection transistor CTFT.

A connection gate electrode CG of the connection transistor CTFT is electrically connected to the second gate line GL2, and a connection drain electrode CD of the connection transistor CTFT is electrically connected to a first electrode of the down-voltage capacitor C_down.

Here, the first electrode of the high liquid crystal capacitor H_clc and the first electrode of the high storage capacitor H_cst are the first pixel part 142. The second electrode of the high liquid crystal capacitor H_clc is the common electrode 220. The second electrode of the high storage capacitor H_cst is the storage line SL.

Moreover, the first electrode of the low liquid crystal capacitor L_clc and the first electrode of the low storage capacitor L_cst are the second pixel part 144. The second electrode of the low liquid crystal capacitor L_clc is the common electrode 220. The second electrode of the storage capacitor H_cst is the storage line SL.

Furthermore, the first electrode of the down-voltage capacitor C_down is the voltage-decreasing electrode 40. The second electrode of the down-voltage capacitor C_down is the voltage-decreasing line VDL.

A common voltage Vcom is applied to the common electrode 220, and a storage reference voltage Vst is applied to the storage line SL. The storage-down voltage Vst_down is applied to the voltage-decreasing line VDL. In one exemplary embodiment, the reference voltage Vst may equal the storage-down voltage Vst_down.

Figure 6:
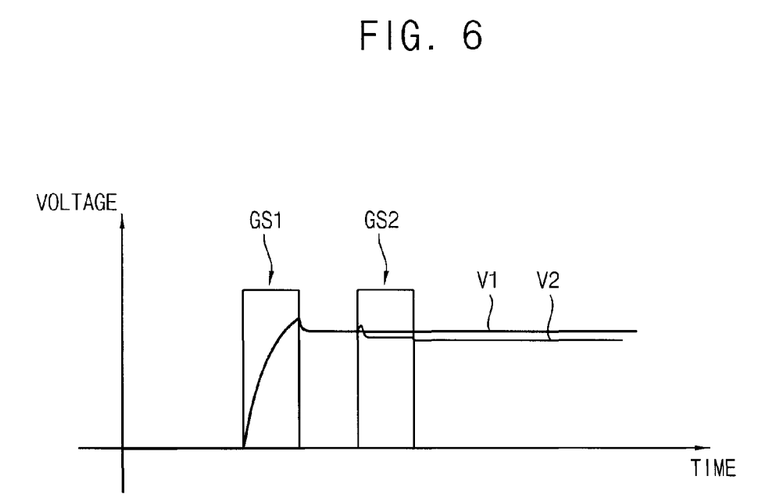
FIG. 6 is a graph illustrating variations of the voltages in the first and second pixel parts of FIG. 5.

FIG. 6 is a graph illustrating variations of the voltages in the first and second pixel parts of FIG. 5. In FIG. 4, the voltage charged in the first pixel part 142 is defined as a first pixel voltage V1, the voltage charged in the second pixel part 144 is defined as a second pixel voltage V2, a signal applied to the first gate line GL1 is defined as a first gate signal GS1, and a signal applied to the second gate line GL 2 is defined as a second gate signal GS2.

Referring to FIG. 6, the first and second pixel voltages V1 and V2 gradually increase to be substantially the same as the data voltage that is applied through the data lines DL when the first gate signal GS1 is applied to the first gate line GL1.

Then, the first pixel voltage V1 may maintain the data voltage, and the second pixel voltage V2 may be decreased to be lower than the data voltage when the second gate signal GS2 is applied to the second gate line GL2. As a result, the second pixel voltage V2 may be lower than the first pixel voltage V1.

Hereinafter, a method of manufacturing the first exemplary embodiment of a display device as described with reference to FIGS. 1 to 4 will be described.

Referring to FIGS. 1 to 5, a gate metal layer is formed on the first transparent substrate 110, and then the gate metal layer is patterned to form gate metal patterns. The gate metal patterns may include the gate line GL having the first and second gate lines GL1 and GL2, the storage lines SL separated from the gate line GL, the gate electrodes GE of the dual transistors DTFT connected to the first gate line, and the connection gate electrodes CG of the connection transistors CTFT connected to the second gate line GL2.

The gate insulation layer 120 is formed on the first transparent substrate 110 to cover the gate metal patterns formed from the gate metal layer.

An active layer and an ohmic contact layer are formed on the first insulation layer 120, and the active layer and the ohmic contact layer are patterned to form the active patterns AP and the ohmic contact patterns OP of the dual transistors DTFT, and the connection active patterns CA and the connection ohmic contact patterns CP of the connection transistors CTFT.

A data metal layer is formed on the first insulation layer 120 to cover the active patterns AP, the ohmic contact patterns OP, the connection active patterns CA, and the connection ohmic contact patterns CP. Then, the data metal layer is patterned to form data metal patterns. The data metal patterns include the data lines DL disposed substantially perpendicular to the gate lines GL, the source electrodes SE connected to the data lines DL, the first and second drain electrodes DE1 and DE2 of the dual transistors DTFT, the first contact electrodes 10 extended from the first drain electrodes DE1, the second contact electrodes 20 extended from the second drain electrodes DE2, the connection source electrodes CS, the third contact electrodes 30 extended from the connection source electrodes CS, the connection drain electrodes CD of the connection transistors CTFT, and the voltage-decreasing electrodes 40 extended from the connection drain electrodes CDs.

According to the first exemplary embodiment of the present invention, the data metal layer is formed after the active layer and the ohmic contact layer are patterned, and then the data metal layer is patterned. However, alternative exemplary embodiments include configurations wherein the active layer, the ohmic contact layer and the data metal layer are sequentially formed, and then the active layer, the ohmic contact layer and the data metal layer are patterned at the same time using a mask.

Then, the second insulation layer 130 is formed on the first insulation layer 120 to cover the data metal patterns formed from the data metal layer, and then a portion of the second insulation layer 130 is removed to form the first, second and third contact holes 133, 135 and 137 and the voltage-decreasing grooves 139. Here, the data insulation layer 130 may include an organic insulation layer 131 and an inorganic insulation layer 132. The inorganic insulation layer 132 may be formed on the organic insulation layer 131. The voltage-decreasing lines VDL may be formed on the inorganic insulation layer 132. However, the inorganic insulation layer 132 is directly formed on the voltage-decreasing electrodes 40 in the voltage-decreasing grooves 139. Therefore, the distance interval between the voltage-decreasing electrodes 40 and the voltage-decreasing line VDL may be reduced. Thus, the capacitance of the down-voltage capacitor C_down may be increased. The formation of the first, second and third contact holes 133, 135 and 137 and the voltage-decreasing grooves 139 may require multiple steps wherein the organic insulation layer 131 corresponding to the voltage decreasing groove 139 is removed prior to the formation of the inorganic insulation layer 132, the inorganic insulation layer 132 is then deposited and patterned to form the first, second and third contact holes 133, 135 and 137.

The organic insulation layer 131 may be formed on the data metal patterns, and the inorganic insulation layer 132 may be formed on the organic insulation layer 131.

Then, a transparent metal layer is formed on the second insulation layer 130, and then the transparent metal layer is patterned to form a plurality of transparent metal patterns. Here, the transparent metal patterns include the pixel electrodes 140 and the voltage-decreasing lines VDL. In the present exemplary embodiment, each of the pixel electrodes 140 includes the first pixel part 142 and the second pixel part 144. The first pixel part 142 is electrically connected to the first contact electrode 10 through the first contact hole 133, and the second pixel part 144 is electrically connected to the second contact electrode 20 and the third contact electrode 30 through the second contact hole 135 and the third contact hole 137, respectively. Additionally, the voltage-decreasing line VDL, the data insulation layer 130, specifically the inorganic insulation layer 132, and the voltage-decreasing electrodes 40 comprise the down-voltage capacitor C_down.

Here, the distance interval between the voltage-decreasing electrodes 40 and the voltage-decreasing line VDL may be reduced due to the voltage-decreasing grooves 139 in the data insulation layer 130. Thus, the capacitance of the down-voltage capacitor C_down may be increased.

Additionally, the storage-down voltage Vst_down stored in the down-voltage capacitor C_down is applied to the voltage-decreasing line VDL. Contact holes for application of the storage-down voltage Vst_down may not be needed; thus, an aperture ratio may be improved.

As a result, the area of gate metal patterns may be reduced, and the area of contact holes may be reduced; thus, the area of a unit pixel capable of transmitting light may be increased and an aperture ratio may be improved.

Exemplary Embodiment 2

Figure 7:
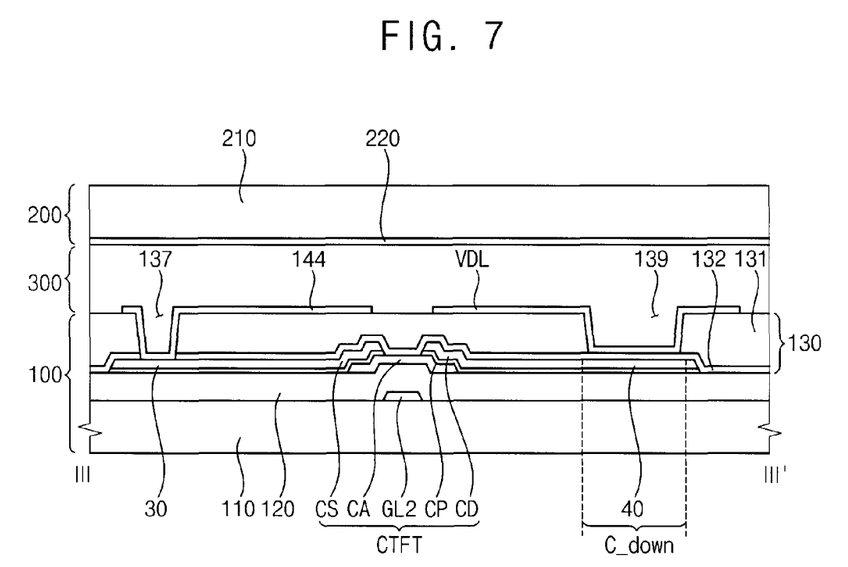
FIG. 7 is a cross-sectional view illustrating an exemplary embodiment of a unit pixel of a second exemplary embodiment of a display device according to the present invention.

FIG. 7 is a cross-sectional view illustrating an exemplary embodiment of a unit pixel of a second exemplary embodiment of a display device according to the present invention. A top plan layout view illustrating a unit pixel of the second exemplary embodiment of a display device according to the present invention is substantially the same as that of the first exemplary embodiment of a display device according to the present invention, except that the organic insulation layer 131 is formed on the inorganic insulation layer 132 and the voltage-decreasing lines VDL occasionally directly contacts the organic insulation layer 131. Additionally, a cross-sectional view taken along a line I-I' in FIG. 1, and a cross-sectional view taken along a line II-II' in FIG. 1 according to the second exemplary embodiment of the present invention are substantially the same as that of the first exemplary embodiment of a display device according to the present invention. Thus, corresponding reference numbers are used for corresponding elements and repetitive descriptions are omitted.

According to the second exemplary embodiment of the present invention, a first substrate 100 may include a first transparent substrate 110, gate lines GL, a gate insulation layer 120, a data insulation layer 130, pixel electrodes 144, voltage-decreasing lines VDL, connection transistors CTFT, contact holes 137, contact electrodes 30, voltage-decreasing grooves 139, and voltage-decreasing electrodes 40.

The down-voltage capacitor C_down includes the voltage-decreasing line VDL, the data insulation layer 130 and the voltage-decreasing electrodes 40. In the present exemplary embodiment, the voltage-decreasing grooves 139 may be formed in the data insulation layer 130 so as to reduce the distance interval between the voltage-decreasing electrode 40 and the voltage-decreasing line VDL. Therefore the capacitance of the down-voltage capacitor C_down may be increased. Voltage-decreasing holes (not shown) are formed through an organic insulation layer 131 included in the data insulation layer 130 by removing portions of the organic insulation layer 131 corresponding to the voltage-decreasing grooves 139.

According to the second exemplary embodiment of the present invention, the organic insulation layer 131 is formed on the inorganic insulation layer 132 included in the data insulation layer 130, and the voltage-decreasing line VDL is formed on the organic insulation layer 131. However, the inorganic insulation layer 132 is directly formed on the voltage-decreasing electrodes 40 aligned with the voltage-decreasing grooves 139. Therefore, the distance interval between the voltage-decreasing electrodes 40 and the voltage-decreasing line VDL may be reduced. Thus, the capacitance of the down-voltage capacitor C_down may be increased.

Additionally, the storage-down voltage Vst_down corresponding to the down-voltage capacitor C_down is applied to the voltage-decreasing line VDL. Thus, gate metal patterns and their corresponding contact holes extending through the gate insulation layer 120 so as to provide the storage-down voltage Vst_down therethrough may not be needed. Therefore, an aperture ratio may be improved.

Here, the contact holes 137 and the connection transistors CTFT in FIG. 7 are substantially the same as the third contact hole 137 and the connection transistors CTFT in FIG. 4. Thus, repetitive descriptions are omitted.

An electrical connection of the second exemplary embodiment of a pixel unit according to the present invention is substantially the same as the electrical connection in FIG. 5 according to the first exemplary embodiment. Thus, the electrical connection of the second exemplary embodiment of a pixel unit is omitted.

Additionally, variations of voltages in first and second pixel parts are substantially equal to the variations of the voltages in the first and second pixel parts of FIG. 6 according to the first exemplary embodiment. Thus, the variations of voltages in the first and second pixel parts according to the second exemplary embodiment are omitted.

Hereinafter, a method of manufacturing the first substrate as described with reference to FIG. 7 will be described.

The gate metal patterns including the gate line GL are formed on the first transparent substrate 110.

The gate insulation layer 120 is formed on the first transparent substrate 110 to cover the gate metal patterns patterned from the gate metal layer.

Then, an active layer and an ohmic contact layer are formed on the first insulation layer 120, and the active layer and the ohmic contact layer are patterned to form the connection active patterns CA and the connection ohmic contact patterns CP of the connection transistors CTFT.

A data metal layer is formed on the first insulation layer 120 to cover the connection active patterns CA, and the connection ohmic contact patterns CP. Then, the data metal layer is patterned to form data metal patterns. The data metal patterns include the connection source electrodes CS, the third contact electrodes 30 extended from the connection source electrodes CS, the connection drain electrodes CD of the connection transistors CTFT, and the voltage-decreasing electrodes 40 extended from the connection drain electrodes CD.

Then, the second insulation layer 130 is formed on the first insulation layer 120 to cover the data metal patterns formed from the data metal layer, and then a portion of the second insulation layer 130 is removed to form the contact holes 137 and the voltage-decreasing grooves 139. Here, the data insulation layer 130 may include an organic insulation layer 131 and an inorganic insulation layer 132. The inorganic insulation layer 132 may be formed on the data metal patterns. The organic insulation layer 131 may be formed on the inorganic insulation layer 132. The voltage-decreasing lines VDL may be formed on the organic insulation layer 131.

Then, a transparent metal layer is formed on the second insulation layer 130, and then the transparent metal layer is patterned to form a plurality of transparent metal patterns. Here, the transparent metal patterns include the pixel electrodes 140 and the voltage-decreasing lines VDL. In the present exemplary embodiment, each of the pixel electrodes 140 includes the first pixel part 142 and the second pixel part 144. The first pixel part 142 is electrically connected to the contact electrodes 30 through the contact holes 137. Additionally, the voltage-decreasing line VDL, the data insulation layer 130 and the voltage-decreasing electrodes 40 define the down-voltage capacitor C_down.

Here, the distance interval between the voltage-decreasing electrodes 40 and the voltage-decreasing line VDL may be reduced due to the voltage-decreasing grooves 139 in the data insulation layer 130. Thus, the capacitance of the down-voltage capacitor C_down may be increased.

Additionally, the storage-down voltage (not shown) corresponding with the down-voltage capacitor C_down is applied to the voltage-decreasing line VDL which is the transparent metal pattern. Contact holes for applying the storage-down voltage Vst_down to a gate metal layer may not be needed; thus, an aperture ratio may be improved.

According to the present invention, the area of gate metal patterns may be reduced, and the area of contact holes may be reduced; thus, the area capable of transmitting light may be increased and an aperture ratio may be improved.

Although a few exemplary embodiments of the present invention have been described, those skilled in the art will readily appreciate that many modifications are possible in the example embodiments without materially departing from the novel teachings and advantages of the present invention.

The foregoing is illustrative of the present invention and is not to be construed as limiting thereof Although a few exemplary embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display substrate comprising:
   a dual transistor electrically connected to a first gate line and a data line, which is disposed in a direction substantially perpendicular to the first gate line, the dual transistor comprising a first drain electrode and a second drain electrode;
   a pixel electrode having a first pixel part and a second pixel part which are respectively connected to the first drain electrode and the second drain electrode;
   a connection transistor electrically connected to the second pixel part and a second gate line which is adjacent to the first gate line, the connection transistor comprising a connection drain electrode;
   a voltage-decreasing electrode extended from the connection drain electrode of the connection transistor;
   a data insulation layer disposed on the voltage-decreasing electrode; and
   a voltage-decreasing line extended in substantially the same direction as the first gate line and the second gate line, the voltage-decreasing line overlapping the voltage-decreasing electrode and the data insulation layer.

2. The display substrate of claim 1, wherein the pixel electrode and the voltage-decreasing line are disposed on a same layer of the display substrate and are formed from a substantially similar transparent metal material.

3. The display substrate of claim 2, wherein the first and second gate lines, a gate electrode of the dual transistor and a connection gate electrode of the connection transistor are disposed on a same layer of the display substrate and are formed from a substantially similar gate metal material.

4. The display substrate of claim 3, wherein the data line, a source electrode of the dual transistor, the first drain electrode of the dual transistor and the second drain electrode of the dual transistor, a first contact electrode extended from the first drain electrode, a second contact electrode extended from the second drain electrode, a connection source electrode of the connection transistor, a third contact electrode extended from the connection source electrode, and the voltage-decreasing electrode are disposed on a same layer of the display substrate and are formed from a substantially similar data metal material.

5. The display substrate of claim 4, further comprising active patterns disposed on the source electrode of the dual transistor, the first drain electrode of the dual transistor, the second drain electrode of the dual transistor, the connection source electrode of the connection transistor and the connection drain electrode.

6. The display substrate of claim 5, further comprising a gate insulation layer disposed between the gate metal material and the data metal material, wherein the data insulation layer is disposed between the data metal material and the transparent metal material.

7. The display substrate of claim 6, further comprising a voltage-decreasing groove disposed in the data insulation layer and aligned with the voltage-decreasing electrode so as to reduce a distance interval between the voltage-decreasing electrode and the voltage-decreasing line.

8. The display substrate of claim 7, wherein the data insulation layer comprises:
an organic insulation layer having a voltage-decreasing hole disposed therein aligned with the voltage-decreasing groove; and
an inorganic insulation layer disposed on the organic insulation layer.

9. The display substrate of claim 7, wherein a length of the voltage-decreasing electrode in a direction substantially parallel to the first gate line is substantially larger than a length of the voltage-decreasing electrode in a direction substantially parallel to the data line.

10. The display substrate of claim 9, wherein a length of the voltage-decreasing groove in the direction substantially parallel to the first gate line is substantially larger than a length of the voltage-decreasing groove in the direction substantially parallel to the data line.

11. The display substrate of claim 7, wherein a first contact hole, a second contact hole and a third contact hole are formed through the data insulation layer,
the first contact hole electrically connects the first pixel part to the first contact electrode;
the second contact hole electrically connects the second pixel part to the second contact electrode; and
the third contact hole electrically connects the second pixel part to the third contact electrode.

12. The display substrate of claim 1, further comprising a storage line underlying the first pixel part and the second pixel part.

13. The display substrate of claim 12, wherein the voltage-decreasing line and the storage line receive a common voltage.

14. The display substrate of claim 1, wherein a portion of the voltage-decreasing line corresponding to the data line is removed to reduce an overlapping area between the voltage-decreasing line and the data line.

15. A display device comprising:
a first substrate comprising:
a dual transistor electrically connected to a first gate line and a data line disposed substantially perpendicular to the first gate line, the dual transistor comprising a first drain electrode and a second drain electrode;
a pixel electrode comprising a first pixel part and a second pixel part which are respectively connected to the first drain electrode and the second drain electrode;
a connection transistor electrically connected to the second pixel part and a second gate line disposed adjacent to the first gate line, the connection transistor comprising a connection drain electrode;
a voltage-decreasing electrode extended from the connection drain electrode of the connection transistor;
a data insulation layer disposed on the voltage-decreasing electrode; and
a voltage-decreasing line extended in substantially the same direction as the first gate line and the second gate line, the voltage-decreasing line disposed on the data insulation layer and overlapping the voltage-decreasing electrode and the data insulation layer;
a second substrate facing the first substrate; and
a liquid crystal layer interposed between the first substrate and the second substrate.

16. The display device of claim 15, wherein the pixel electrode and the voltage-decreasing line are disposed on a same layer of the display substrate and are formed from a substantially similar transparent metal material.

17. The display device of claim 16, further comprising a voltage-decreasing groove aligned with the voltage-decreasing electrode so as to reduce a distance interval between the voltage-decreasing electrode and the voltage-decreasing line.

* * * * *